US010230816B2

(12) United States Patent
Banatwala et al.

(10) Patent No.: US 10,230,816 B2
(45) Date of Patent: Mar. 12, 2019

(54) COMMUNICATION MANAGEMENT IN A SOCIAL NETWORKING ENVIRONMENT

(71) Applicant: International Business Machines Corporation, Armonk, NY (US)

(72) Inventors: Mustansir Banatwala, Hudson, NH (US); David A. Brooks, Arlington, MA (US); Miguel A. Estrada, Hollis, NH (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 15/151,490

(22) Filed: May 11, 2016

(65) Prior Publication Data
US 2017/0331916 A1 Nov. 16, 2017

(51) Int. Cl.
G06F 15/16 (2006.01)
H04L 29/08 (2006.01)
H04L 12/58 (2006.01)
G06F 17/21 (2006.01)
G06F 17/27 (2006.01)
G06Q 10/10 (2012.01)
H04W 4/21 (2018.01)

(52) U.S. Cl.
CPC .......... *H04L 67/306* (2013.01); *G06F 17/212* (2013.01); *G06F 17/2785* (2013.01); *G06Q 10/107* (2013.01); *H04L 51/32* (2013.01); *H04W 4/21* (2018.02)

(58) Field of Classification Search
CPC ..... H04L 67/306; H04L 51/32; G06F 17/212; G06F 17/2785; G06F 17/30699; G06Q 10/107

USPC ........................................................ 709/205
See application file for complete search history.

(56) References Cited

U.S. PATENT DOCUMENTS 7,818,373 B2    12/2010  Best et al.
9,069,825 B1 *   6/2015  Chang ............... G06F 17/30864
2004/0080534 A1  4/2004  Quach
(Continued)

FOREIGN PATENT DOCUMENTS

WO    WO2007101263 A2    9/2007

OTHER PUBLICATIONS

International Business Machines Corporation, "Enhancing Broadcast E-Mails Based on Workgroup Feedback", IP.com IPCOM000178089D, Jan. 15, 2009.
(Continued)

*Primary Examiner* — Brian Whipple
*Assistant Examiner* — Hannah S Wang
(74) *Attorney, Agent, or Firm* — L. Jeffrey Kelly

(57) ABSTRACT

Disclosed aspects relate to communication management in a social networking environment. A source communication with respect to a topic may be received by the social networking environment. In response to receiving the source communication, a response communication by a first user may be detected. The response communication may relate to the topic. Using a set of topic expertise data for the first user with respect to the topic, a trust factor for the user with respect to the topic may be determined. Based on the trust factor, a communication arrangement may be established in the social networking environment.

20 Claims, 4 Drawing Sheets

(56) References Cited

U.S. PATENT DOCUMENTS

| | | | | |
|---|---|---|---|---|
| 2008/0162640 | A1* | 7/2008 | Boss | G06Q 10/107 709/206 |
| 2011/0106746 | A1* | 5/2011 | Ventilla | G06Q 10/10 706/50 |
| 2012/0036462 | A1* | 2/2012 | Schwartz | G06Q 10/06 715/771 |
| 2012/0191791 | A1 | 7/2012 | Verhaeghe et al. | |
| 2013/0173687 | A1* | 7/2013 | Tuchman | G06Q 30/0601 709/202 |
| 2013/0298038 | A1* | 11/2013 | Spivack | H04L 65/403 715/753 |
| 2014/0229476 | A1* | 8/2014 | Fouad | G06F 17/3069 707/729 |
| 2014/0310288 | A1* | 10/2014 | Jockisch | G06F 17/3053 707/748 |
| 2014/0324757 | A1* | 10/2014 | Tabrizi | G06F 17/30 706/50 |
| 2016/0371276 | A1* | 12/2016 | Furtado | G06F 17/3053 |

OTHER PUBLICATIONS

Disclosed Anonymously, "System and Method of Monitoring Co-Messengers' or Coemailers' Activities Using Metadata", IP.com IPCOM000222555D, Oct. 17, 2012.

Disclosed Anonymously, "Method and System to Validate Reviews/Recommendations of Content in a Social Software System", IP.com IPCOM000240862D, Mar. 6, 2015.

* cited by examiner

COMMUNICATION MANAGEMENT IN A SOCIAL NETWORKING ENVIRONMENT

BACKGROUND

This disclosure relates generally to computer systems and, more particularly, relates to communication management in a social networking environment. Communication management may be desired to be performed as efficiently as possible. The amount of communication data that needs to be managed by enterprises is increasing. As data needing to be managed increases, the need for communication management efficiency may increase.

SUMMARY

Aspects of the disclosure relate to assigning a trust factor to recipients of a communication in a social networking environment to indicate an advised level of cognitive engagement. A communication may be monitored and classified according to a subject. A trust factor may be assigned to recipients of the communication based on an assessment of a variety of factors including knowledge of the subject, current communication status, past reliability, and the like. An indication of the trust factor may be provided to one or more recipients of the communication. Based on the trust factor assigned to other recipients, an arrangement for handling the communication may be established. As such, a user's social network connections may be leveraged to facilitate communication efficiency.

Disclosed aspects relate to communication management in a social networking environment. A source communication with respect to a topic may be received by the social networking environment. In response to receiving the source communication, a response communication by a first user may be detected. The response communication may relate to the topic. Using a set of topic expertise data for the first user with respect to the topic, a trust factor for the user with respect to the topic may be determined. Based on the trust factor, a communication arrangement may be established in the social networking environment.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
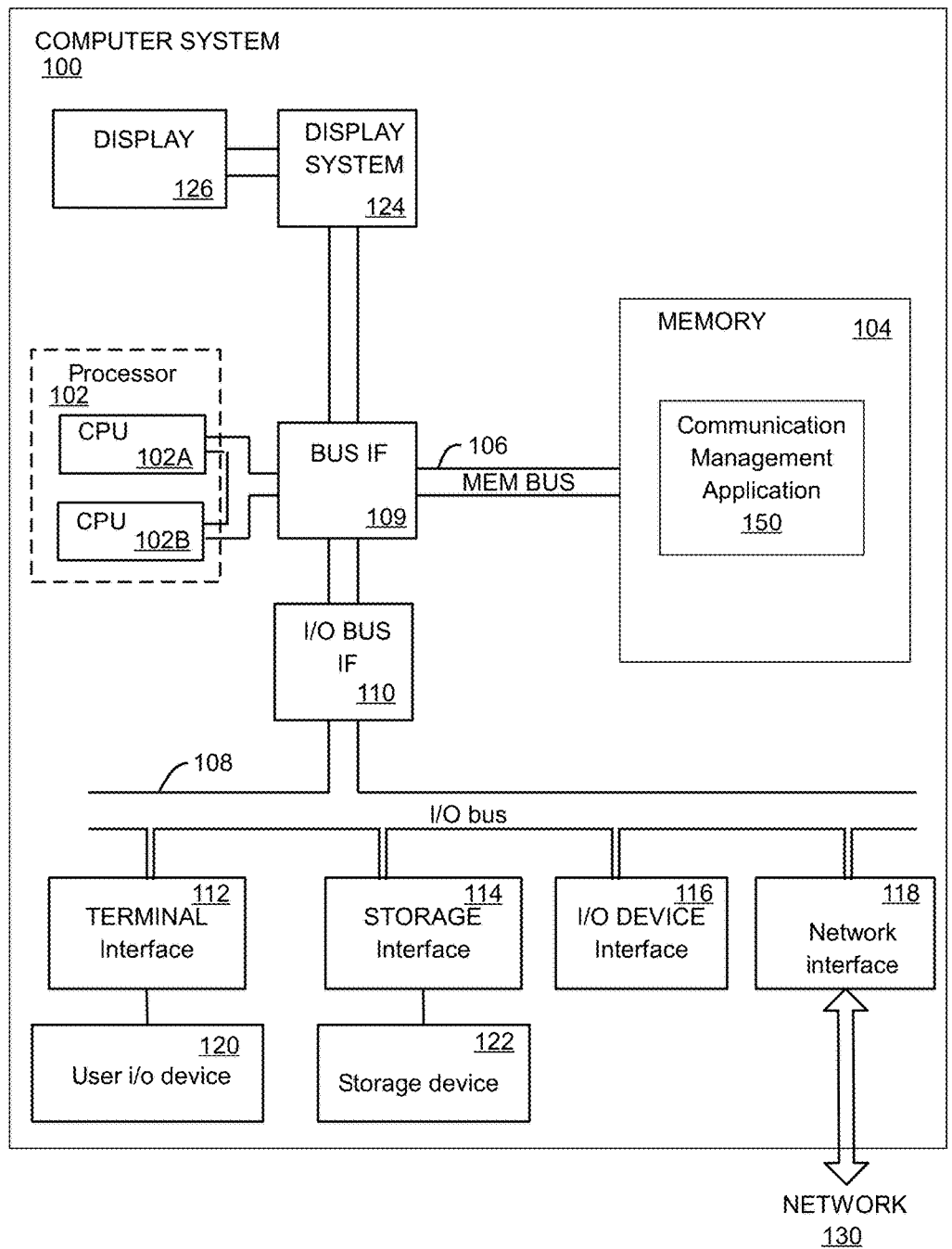
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to assigning a trust factor to recipients of a communication in a social networking environment to indicate an advised level of cognitive engagement. A communication may be monitored and classified according to a subject. A trust factor may be assigned to recipients of the communication based on an assessment of a variety of factors including knowledge of the subject, current communication status, past reliability, and the like. An indication of the trust factor may be provided to one or more recipients of the communication. Based on the trust factor assigned to other recipients, an arrangement for handling the communication may be established. As such, a user's social network connections may be leveraged to facilitate communication efficiency.

As the amount of information available over computer networks, such as the Internet, rapidly increases, users often make use of multiple communication channels (e.g., email inboxes, social network activity streams) to manage interactions and correspondence with other users. In some situations, users may take time processing the information and associated context of a source communication (e.g., message), and generating a response (e.g., reply or solution) to the originator or other recipients of the message. Aspects of the disclosure relate to the recognition that, in certain situations, multiple users may spend time responding to or otherwise handling the same source communication, resulting in a duplication of time and efforts. In such situations, positive impacts may be associated with management of the source communication being performed by a single user, and notifying other recipients of whom the source communication is being handled by. Depending on the user and the topic of the source communication, other recipients of the message may disengage and perform other tasks (e.g., if the user is trusted with respect to the topic), or engage in handling the source communication (e.g., if the user is not trusted with respect to the topic). Accordingly, aspects of the disclosure relate to establishing a communication arrangement to notify recipients of a source communication that another user is managing the source communication, as well as providing indication of a trust factor for the user.

Aspects of the disclosure include a method, system and computer program product for communication management in a social networking environment. A source communication with respect to a topic may be received by the social networking environment. The social networking environment may include one or more of an instant messaging service, short messaging service, wiki, social community, newsfeed, email, project collaboration, or the like. In response to receiving the source communication, a response communication by a first user with respect to the topic may be detected by the social networking environment.

Using a set of topic expertise data for the first user with respect to the topic, a trust factor for the first user with respect to the topic may be determined. The trust factor may include one or more of a competence level of the first user for the topic, a current status of handling the source communication, a historical reliability of handling other communications based on the topic, a source user of the source communication, a set of source recipients of the source communication, a set of response recipients of the response communication, a temporal urgency element, or the like. Determining the trust factor may include using an analysis technique to examine at least one of the source communication or the response communication. Based on and in response to the examining, the topic may be extracted. In response to the extracting, the topic may be correlated to the set of topic expertise data for the first user. The trust factor may be computed for the first user with respect to the topic. In embodiments, the trust factor may include a trust score. An indication of the trust score may be provided in the social networking environment.

Based on the trust factor for the first user with respect to the topic, a communication arrangement may be established in the social networking environment. The communication arrangement may include a structured prioritization for presentation via a graphical user interface. At least one of the source communication or the response communication may be included in the communication arrangement. In embodiments, the communication arrangement may include a response status component which corresponds to a state of the response communication. The communication arrangement may include a set of visual indicators. The set of visual indicators may include a dynamic indicator when the response communication is in an in-progress state. The in-progress state may include a threshold temporal period. In embodiments, the dynamic indicator may be disabled. Altogether, aspects of the disclosure may provide performance or efficiency benefits (e.g., speed, flexibility, resource usage, productivity). Aspects may save resources such as bandwidth, processing, or memory.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a communication management application 150. In embodiments, the communication management application 150 may include instructions or statements that execute on the processor 102 or instructions or statements that are interpreted by instructions or statements that execute on the processor 102 to carry out the functions as further described below. In certain embodiments, the communication management application 150 is implemented in hardware via semiconductor devices, chips, logical gates, circuits, circuit cards, and/or other physical hardware devices in lieu of, or in addition to, a processor-based system. In embodiments, the communication management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
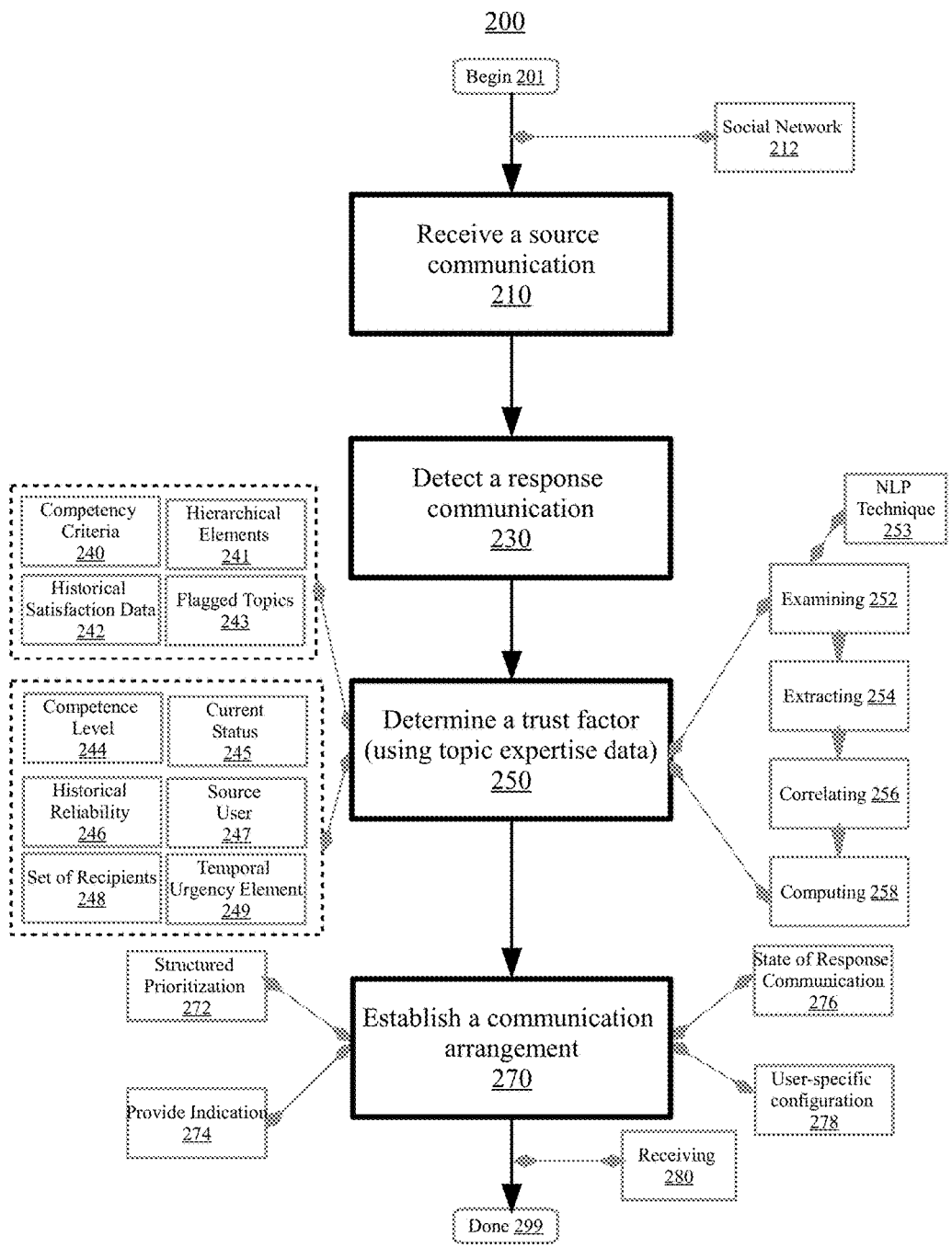
FIG. 2 is a flowchart illustrating a method for managing communication in a social networking environment, according to embodiments.

FIG. 2 is a flowchart illustrating a method 200 for managing communication in a social networking environment. Aspects of method 200 relate to determining a trust factor for one or more users with respect to a topic based on a response communication. Based on the trust factor, a communication arrangement may be established for a user in the social networking environment. The communication arrangement may facilitate communication efficiency. The method 200 may begin at block 201.

At block 210, a source communication with respect to a topic may be received. The source communication may be received by the social networking environment. Receiving can include collecting, requesting, gathering, obtaining, or otherwise accepting delivery of the source communication. In embodiments, the source communication may be sent by a first party (e.g., source user) to multiple recipients users. For instance, receiving can include connecting to a central server and collecting the source communication. In embodiments, receiving can include accepting transmission of the source communication directly from another party. Generally, the source communication can include a textual message, post, notification, voice message, video message or other form of correspondence or information transmission. As examples, the source communication may include an email message, instant message, text message, discussion forum post, newsfeed post, phone call, or the like. In embodiments, the source communication may relate to a topic. The topic may include a subject matter, theme, question, or other issue. Example topics may include software development, budget management, customer support, history, renewable energy, stock market trends, oil prices, board games, sports, corn farming, and the like. Other methods of receiving the source communication are also possible.

In embodiments, receiving the source communication may include using a social networking environment at block 212. Generally, the social networking environment can include a platform that offers communication tools to facilitate the sharing of information, ideas, pictures, video, messages, and other data between a community of users. As examples, the social networking environment may include one or more of an instant messaging platform (e.g., chat service), a short messaging service (e.g., mobile text messaging), a wiki database (e.g., user maintained digital encyclopedia), social community (e.g., group of users), newsfeed (e.g., interface for reception and display news events and activity data), email platform (e.g., internet or other network-based messaging tool), project collaboration (e.g., group of users working together on a task), or the like. In embodiments, the social networking environment may include a number of linked web pages that support chat, messaging, and other information sharing services between users. In embodiments, the social networking environment may host profile pages for users that include information regarding individuals' areas of expertise, activities, background, work experience, schedule, past projects, and the like. Other types of social networking environment and social networking features are also possible.

Consider the following example. A user may create a private discussion group in the social networking environment, inviting four other users to join in the discussion. The user may then create a source communication in the form of a post in the private discussion group that is visible to the other four invited users. The post may be associated with a topic of "Earnings Presentation." Accordingly, in certain embodiments, the four invited users may receive notifications in their own personal social network newsfeeds informing them of the source communication post. As another example, a user may write a source communication in the form of an email and select two users as recipients. The email may be sent by the user to an outgoing mail server, and fetched from the server for delivery to the two recipients. Other methods of receiving the source communication are also possible.

At block 230, a response communication may be detected. The response communication may be detected by the social networking environment in response to receiving the source communication. The response communication may be created by a first user with respect to the topic. Generally, detecting can include monitoring, recognizing, discovering, ascertaining, sensing, or otherwise identifying the response communication. In embodiments, detecting can include identifying that the response communication has been submitted, transmitted, or made public to one or more other users. For example, in a discussion forum, detecting may include recognizing that a new post has been submitted in reply to a source communication post. In embodiments, detecting can include dynamically ascertaining that the response communication is in-progress by one or more users (e.g., a user is typing a reply, gathering information to craft a response, or otherwise engaged in replying to the source communication). For instance, in certain embodiments, detecting may include monitoring for keystroke input via a keyboard, input of a "reply" command to a communication interface, or other input device. Other methods of detecting the response communication are also possible.

In embodiments, the response communication may be a reply, answer, reaction, feedback, or other action taken to respond to the source communication. As an example, in the case where the source communication includes an email message, the response communication may include an email drafted in reply to the original email message. The response communication may be related to the same topic as the source communication. For instance, for a source communication (e.g., an instant message) related to a topic of "code debugging," the response communication may also pertain to code debugging. In embodiments, aspects of the disclosure relate to the recognition that the response communication may be a different means of communication than the source communication. As an example, in response to receiving a source communication in the form of an email, a user may respond via a phone call, instant message, video call, or the like. Other types of response communication are also possible.

Consider the following example. In a social network environment, a source communication in the form of an email may be sent by a source user to three recipient users. The source communication may have a title (e.g., topic) of "Product Presentation." In response to the source communication, a first user may initiate a private instant messaging conversation with the source user. In embodiments, the instant messaging log may be parsed (e.g., using a natural language processing technique) to determine whether the subject of the conversation is related to the source communication topic of "Product Presentation." Accordingly, in response to ascertaining that the subject of the conversation pertains to the topic of the source communication, the instant message reply of the first user may be identified as the response communication. Other methods of detecting the response communication are also possible.

At block 250, a trust factor may be determined. The trust factor may be determined by the social networking environment using a set of topic expertise data for the first user with respect to the topic. The trust factor may be determined for the first user with respect to the topic. Determining can include computing, identifying, calculating, assigning, or otherwise ascertaining the trust factor using the set of topic expertise data. In embodiments, determining the trust factor can include evaluating the credibility of the first user with regard to the topic of the source communication. As an example, determining the trust factor may include assessing past contributions, educational background, work experience, and other information to appraise the reliability or level of expertise of the first user with respect to the topic of the source communication. In embodiments, determining the trust factor may include generating a quantitative indication (e.g., trust score) of the first user's credibility regarding a particular topic. Other methods of determining the trust factor are also possible.

In embodiments, at least one of the source communication or the response communication may be examined at block 252. Examining the source/response communication may include using an analysis technique. Generally, examining can include analyzing (e.g., performing an inspection of the source/response communication), evaluating (e.g., generating an appraisal of the source/response communication), resolving (e.g., ascertaining an observation/conclusion/answer with respect to the source/response communication), parsing (e.g., deciphering structured and unstructured data constructs of the source/response communication), querying (e.g., asking a question regarding the source/response communication), or categorizing (e.g., organizing by a feature or type of the source/response communication). In embodiments, examining can include identifying data or metadata within the source/response communication that pertains to an originator (e.g., creator) of the communication. For instance, in certain embodiments, the name of the originator of the communication may be identified and cross-referenced with an organizational hierarchy to map the originator with a role in the organization (e.g., President, Manager, Administrative Assistant, Salesman). Other methods of examining the source/response communication are also possible.

In embodiments, examining the source/response communication may include using a natural language processing technique at block 253. In embodiments, the natural language processing technique can include a software tool, widget, or other program configured to parse semantic or syntactic elements of the source/response communication. The natural language processing technique may recognize keywords (e.g., product names, names of key individuals), contextual information (e.g., whether the topic of the communication has been discussed before, main topic versus brief reference), and metadata tags (e.g., abbreviations for organizational roles of individuals, other recipients of the communication) associated with the source/response communication. In embodiments, the natural language processing technique may be configured to analyze syntactic and semantic elements including word frequency, word meanings, text font, italics, hyperlinks, proper names, noun phrases, parts-of-speech, and the context of words to identify attributes or characteristics regarding the nature of the source/response communication (e.g., the relationship of the sender and recipients, relative importance/urgency of the communication). Other methods of using the natural language processing technique are also possible.

In embodiments, the topic of the source/response communication may be extracted at block 254. The topic may be extracted both based on and in response to examining the source/response communication. Generally, extracting can include identifying, ascertaining, or otherwise determining the subject matter or main idea of the communication. In embodiments, extracting the topic may include using the natural language processing technique described herein to analyze subject lines (e.g., of an email), summary information, keywords, figure captions, and other text descriptions to ascertain the topic of the source/response communication. In embodiments, the topic may be identified in relation to a subject line of the source communication. For instance, for a source communication with a subject line of "Global Semiconductor Industry Revenue Growth Forecast and Analysis," a topic of "Semiconductor Industry Outlook" may be identified. In embodiments, extracting the topic may include examining the frequency of keywords used within the communication, and identifying a topic related to the most frequently used terms. In certain embodiments, extracting the topic may include using a concept mapping technique to identify secondary or tertiary concepts of the source/communication, and examine these concepts to ascertain a central topic to which they all relate. As an example, in response to the natural language processing technique identifying secondary topics (e.g., keywords) of "hypervisor," "host architecture," and "operating system emulation," a central topic of "virtual machines" may be ascertained. Other methods of extracting the topic of the communication are also possible.

In embodiments, the topic may be correlated to the set of topic expertise data for the first user at block 256. Correlating the topic to the set of topic expertise data may be performed in response to extracting. Correlating can include linking, relating, mapping, or otherwise associating the topic with the set of topic expertise data. In embodiments, correlating may include identifying a set of topic expertise data for the first user that corresponds to the topic of the source/response communication. For instance, in response to extracting the topic of the communication, the social networking environment may include examining a social networking profile (e.g., page or group of pages that include information regarding the first user) for the first user to ascertain aspects of the first user's educational background or work experience (e.g., topic expertise data) that relate to the topic of the source/response communication. Consider the following example. In response to extracting a topic of "stream applications" from the source/response communication, the social media environment may analyze a social networking profile for the first user and identify that the first user has an educational background in software development and seven years of work experience as a stream application engineer. Accordingly, these aspects of the first user's background may be correlated (e.g., linked, associated) to the topic of "stream applications." Other methods of correlating the topic to the set of topic expertise data for the first user are also possible.

In embodiments, the set of topic expertise data can include aspects, traits, features, or characteristics of a user's background that demonstrate, verify, substantiate, or otherwise establish the expertise, credibility, or reliability of a user with respect to a particular field or discipline. In embodiments, the set of topic expertise data may include a set of competency criteria at block 240. The set of competency criteria may represent the proficiency, knowledge, qualifications, or authorizations of a user with respect to a set of topics. As an example, for a topic of actuarial science, the set of competency criteria may include the level of actuarial exams passed by the user. In embodiments, the set of topic expertise data may include a set of hierarchical elements for utilization to weight the set of competency criteria at block 241. The hierarchical elements may represent the role or position of the user in an organization. In certain embodiments, the hierarchical elements may be used to weight (e.g., substantiate, corroborate, validate) the set of competency criteria. For instance, an individual who occupies a position of higher organizational status than another user may be considered to be more credible than an individual of lower status regarding a particular topic (e.g., Senior Software Engineer as compared to an Entry-level Software Engineer).

In embodiments, the set of topic expertise data may include a set of historical satisfaction data at block 242. The set of historical satisfaction data may include an evaluation of the past performance of an individual with respect to tasks related to a particular topic. In embodiments, the historical satisfaction data may take into account rating information for the user such as job related performance-evaluations, public or private task appraisals (e.g., likes or dislikes received in response to social media submissions pertaining to a topic), publication citations, timeliness, or the like. As an example, in relation to a topic of theoretical physics, an individual who makes regular submissions to science journals, has a high number of publications cited by others in the same field, and makes timely and constructive contributions to research projects may have a substantially positive level of historical satisfaction. In embodiments, the set of topic expertise data may include a set of flagged topics at block 243. The set of flagged topics may include one or more topics that are designated for special treatment or handling. For instance, the set of flagged topics may include topics that are urgent, important, confidential, sensitive, specialized, irregular, or the like. As an example, in certain embodiments, a topic related to the research and development of future products may be flagged as a topic that should be limited to individuals who have signed a non-disclosure agreement. Other types of topic expertise data are also possible.

In embodiments, the trust factor may be computed at block 258. Generally, computing can include calculating, estimating, ascertaining, assigning, measuring, or otherwise determining the trust factor. Computing the trust factor may include evaluating the set of topic expertise data with respect to the topic of the source/response communication, and using one or more computation techniques, operations, or algorithms to generate an indication of the relative competence, reliability, or credibility of a user with respect to a particular topic. In embodiments, topic expertise data (e.g., for a user) that is determined to have a substantial degree of relevance, significance, or pertinence with respect to the topic may correspond to a relatively greater trust factor. Consider, for example, a source/response communication with an identified topic of "differential geometry." In embodiments, one of the recipients of the communication may possess a doctorate degree in mathematics, multiple publications regarding differential geometry, and be the Mathematics Department Chair at a prestigious university. These factors may be identified as topic expertise data, evaluated, and used to ascertain a trust factor for the user. Other methods of computing the trust factor are also possible.

In embodiments, the trust factor may include a quantitative or qualitative measure, representation, expression, or indication of the reliability, credibility, dependability, expertise, or proficiency of an individual (e.g., the first user) with respect to a particular topic. In embodiments, the trust factor may include one or more factors that substantially correspond to the set of topic expertise data (e.g., a particular trust factor may be associated with a user in response to identifying that the user has a corresponding set of expertise data). In embodiments, the trust factor may include a competence level of the first user for the topic at block 244. The competence level may be an indication that a user possesses a threshold level of proficiency, knowledge, qualification, or authorization with respect to a particular set of topics. For instance, a user with a degree, position, certification, or certain amount of working experience with respect to a topic may be considered to achieve the threshold competence level for the topic. The competence level 244 may substantially correspond with the competency criteria block 240. In embodiments, the trust factor may include a current status at block 245. The current status may be an indication of the present state or circumstances of handling the source communication. As an example, the current status may indicate that a user is actively generating a response communication to handle the source communication, or has designated time in his/her schedule to handle the source communication (e.g., users that indicate intention to manage a communication may be associated with a higher likelihood of handling the communication). Other types of trust factors are also possible.

In embodiments, the trust factor may include a historical reliability at block 246. The historical reliability may include an indication that a particular user has reliably and dependably handled past communications based on the topic. As an example, for a topic of "machine learning," an individual who has capably handled (e.g., timely and satisfactorily managed) 14 out of a total 16 requests related to machine learning may be considered to have a positive historical reliability record. In embodiments, the trust factor may include a source user at block 247. In embodiments, the source user may be the sender, generator, or originator of the source communication. Aspects of the disclosure, in embodiments, relate to the recognition that the originator of a source communication may be considered to be credible, reliable, or trustworthy regarding the topic of the source communication. For instance, for a topic that relates to confidential information, the source user may be authorized to access classified materials related to the topic. Other types of trust factor are also possible.

In embodiments, the trust factor may include a set of recipients at block 248. The set of recipients may include source recipients of the source communication or response recipients of the response communication. In embodiments, recipients of the source communication or the response communication may be considered to be dependable or qualified to manage information or tasks related to the topic. In certain embodiments, the trust factor may be associated with a subgroup of recipients. As an example, in a scenario where the source communication is an email, the trust factor may be associated with main recipients (e.g., those included on the "to" line, not the CC line). For instance, in embodiments, one or more individuals may be designated as primary recipients (e.g., the individuals from whom action or response is requested). In embodiments, the trust factor may include a temporal urgency element at block 249. Generally, the temporal urgency element can include an index of the urgency of the source communication in relation to the time availability of one or more recipients. In embodiments, the social networking environment may access the calendars or schedules of one or more recipients to determine how much time is available in the recipients' schedule over given timeframe (e.g., 1 day, 3 days, 1 week, 1 month). As an example, a recipient who has a substantial amount of available time may be associated with a trust factor (e.g., users with available time may have time to handle/manage the communication) while a recipient with a very busy schedule and little available time may not be associated with a trust factor (e.g., he/she may not have time to manage/handle the communication). Other types of trust factor are also possible.

Consider the following example. A source communication in the form of an email may be received by five recipient users from a source user. A topic of "cloud services" may be extracted from the source communication. In embodiments, the social networking environment may dynamically detect an in-progress response communication (e.g., input of a "reply" command followed by keystroke inputs) by a first user. As described herein, the social networking environment may access a social network profile for the first user and identify a set of topic expertise data related to the topic. In embodiments, topic expertise data including 4 years work experience as a cloud computing engineer (e.g., competency criteria) and 12 previous correspondence instances positively rated by the source user (e.g., historical satisfaction data) may be identified. Accordingly, trust factors of a competence level and historical reliability may be determined for the first user. Other methods of determining the trust factor are also possible.

At block 270, a communication arrangement may be established. The communication arrangement may be established based on the trust factor for the first user with respect to the topic. Generally, establishing can include generating, constructing, instantiating, creating, displaying, or providing the communication arrangement. The communication arrangement may include an interface, platform, or service configured to organize or arrange at least the source communication or response communication based on a determined trust factor. In embodiments, establishing the communication arrangement may include arranging or managing the source/response communication based on the determined trust factor to indicate the relative importance or significance (e.g., appropriate level of cognitive engagement) of the source/response communication to a particular user. As an example, in a scenario in which a user associated with a substantially high trust factor indicates intention to handle a communication, establishing may include notifying other users that additional input on their part may be unnecessary. Other methods of establishing the communication arrangement are also possible.

In embodiments, the communication arrangement may include a structured prioritization at block 272. The structured prioritization may include at least one of the source communication or the response communication. The structured prioritization may be configured for presentation via a graphical user interface. Generally, the structured prioritization can include a visual arrangement for formatting, categorizing, sorting, ordering, ranking, or otherwise organizing information based on relative importance or significance (e.g., priority) to a user. In embodiments, source/response communications of high priority may be visually emphasized so as to draw attention or indicate urgency or importance, while source/response communications of low priority may be visually de-emphasized to indicate that less user attention is necessary. In embodiments, the communication arrangement may include providing visual indicators or textual notifications to indicate the priority of a particular source/response communication. As an example, a particular source communication that is associated with a high priority may be highlighted with a red highlighted border and moved upward to a prominent (e.g., easily seen) location within the graphical interface. In response to a user placing a cursor (e.g., mouse cursor, finger) over the source communication, a text notification may be displayed informing the user of the nature of the communication (e.g., sender, other receivers, topic, response deadline) and other information. Other methods of establishing the communication arrangement and structured prioritization are also possible.

In embodiments, an indication of a trust score may be provided in the social networking environment at block 274. The indication of the trust score may be based on the trust factor associated with a user in the communication arrangement. Generally, the trust score can include a quantitative measure, grade, rank, representation, index, or other expression of the trust factor associated with a user. In embodiments, the trust score may be expressed as an integer between 0 and 100, where greater values are associated with higher levels of trust (e.g., reliability, credibility, dependability, expertise, or proficiency) and lesser values are associated with lower levels of trust. In embodiments, the trust score may be expressed using a letter grading system (e.g., A, B, C, D, F). Consider the following example. For a topic of "stock exchange," an individual who holds an MBA (Master of Business Administration) degree from a prestigious business school and has worked for 23 years at a large stock broking firm may be associated with a relatively high trust score (e.g., 84) while an individual who has a degree in art and holds a position at a museum may have a relatively low trust score (e.g., 19). In embodiments, the trust score may be provided in the social networking environment. For instance, the trust score may be displayed in the corresponding individual's social networking profile, next to their name in the communication arrangement, or the like. In embodiments, an indication for the trust score may be provided visually. For instance, particular trust score levels may be associated with visual identifiers such as certain highlighting colors (e.g., 90-100 associated with gold, 80-99 associated with red), markers (e.g., stars, crowns), or the like. Other methods of indicating the trust score are also possible.

In embodiments, the communication arrangement may include a response status component which corresponds to a state of the response communication at block 276. Generally, the response status component can include an indication of the current state or circumstance of the response communication. For instance, in embodiments the response status component may indicate that the response communication is not currently being handled by any recipients of the source communication. In embodiments, the response status component may indicate that the response communication is currently being handled (e.g., written, created, generated) or has already been sent by one or more recipients of the source communication. In embodiments, the name of the recipient who is handling/sent the response communication may be displayed along with the user's associated trust score. In certain embodiments, if the trust score of the user who is handling/sent the response communication is below a threshold level, the source communication may be visually emphasized (e.g., highlighted) in the structured prioritizations provided to other recipients of the source communication (e.g., as the response communication is being handled by an individual for whom reliability/dependability have not been verified, attention/engagement/follow-up may be required from other users). In certain embodiments, if the trust score of the user who is handling/sent the response communication above a threshold level, the source communication may be visually de-emphasized (e.g., grayed out) in the structured prioritizations provided to other recipients of the source communication (e.g., as the response communication is being handled by a reliable/dependable individual, less attention/engagement may be required from other users). Other methods of establishing the structured prioritization are also possible.

In embodiments, the communication arrangement may include a user-specific configuration at block 278. The user-specific configuration may differ for a set of unique users. Aspects of the disclosure, in embodiments, relate to the recognition that the trust factor between two individual users may vary based on the individual (e.g., each individual trusts others differently). Accordingly, in certain embodiments, aspects of the disclosure relate to generating the trust factor for a user relative to other users (e.g., based on topic expertise data identified for the users in a social networking profile). For instance, in a group of individuals with a substantial amount of experience in the same general discipline, particular users may have narrow areas of specialty that influence the trust score between them and other members of the group differently than individuals outside the group (e.g., individuals with other backgrounds and areas of expertise). As an example, consider a group of four software engineers, each associated with trust factors of competence level and historical reliability related to software application development (e.g., based on topic expertise data including education and work experience). In embodiments, the four software engineers may receive a source communication with a topic of "compiler error messages" from a source user associated with a business degree who works in a marketing role (e.g., an individual who is not associated with a trust factor of competence level for software application development). Accordingly, as each of the four engineers has experience in software development and the source communication relates to a general software development topic, from the perspective of the originator of the source communication, each engineer may be associated with a substantially high trust score (e.g., the four recipients are "experts" relative to the source user). As another example, one of the four software engineers may send a source communication with a topic of "ISO C++ inline assembler language syntax" to the other three software engineers. In certain embodiments, a first software engineer of the group of software engineers may not be familiar with the particular topic of the source communication (e.g., he or she may not be associated with a trust factor of competence level for the topic). Accordingly, from the perspective of the originator of the communication, the first software engineer may be associated with a relatively low trust score (e.g., despite being an "expert" related to software development overall, he or she may not have experience with this narrow subject). Other methods of establishing the user-specific configuration are also possible.

In embodiments, the response communication may be received at block 280. The response communication may be received by the social networking environment in response to establishing the communication arrangement based on the trust factor for a first user with respect to a first topic. Generally, receiving can include collecting, requesting, gathering, obtaining, or otherwise accepting delivery of the response communication. As described herein, in certain embodiments, the response communication may be dynamically detected in an in-progress state, prior to submission, publication, or transmission to other users. Accordingly, in certain scenarios, the response communication may be received following establishment of the communication arrangement. Other methods of receiving the response communication are also possible.

Consider the following example. A source communication from a source user may be received by four recipients. The source communication may be examined using a natural language processing technique, and a topic of "big data management" may be extracted. An in-progress response communication being drafted by a first recipient user may be detected by the social networking environment. As described herein, in response to detecting the response communication, a trust factor may be determined for the first recipient user based on topic expertise data related to the topic of the source communication. In embodiments, the social networking environment may access a social networking profile for the first recipient user and identify that the user has a degree in biology and less than a year of working experience related to big data. Accordingly, in embodiments, the topic expertise data of the first recipient user may not correspond to one or more trust factors (e.g., the education and work experience of the user may not suggest knowledge or proficiency related to big data), and a trust score of 24 may be computed for the first recipient user with respect to big data. In embodiments, the trust score of 24 may be below a threshold trust score level of 60 (e.g., a minimum trust score determined automatically by the social network environment based on topic or designated by a user). As described herein, a communication arrangement may be generated for one or more recipients of the source communication. In embodiments, the communication arrangement may include a structured prioritization that is provided to the three recipient users other than the first recipient user (e.g., the recipient drafting the response communication). The structured prioritization may visually emphasize the source communication with red highlighting and a position at the top of the graphical interface. As such, other users may be notified that action or engagement related to the source communication may be necessary (e.g., as the response communication is being handled by a user with a trust score below a threshold level, follow-up action may be necessary). Other methods of managing the source and response communication are also possible.

In certain embodiments, the detecting, identifying, and establishing steps described herein may each occur in an automated fashion without user invention. In embodiments, the receiving, detecting, determining, establishing, and other steps described herein may be carried out by an internal communication management module maintained in a persistent storage device of a computing node that also hosts a communication platform (e.g., email, social networking service). In certain embodiments, the steps described herein may be carried out by a communication management module located separately from the computing node that includes the communication platform. For instance, the communication management module may be hosted by a remote computing device that is accessible to the communication platform (e.g., through a subscription, usage-based, or other service model).

Method 200 concludes at block 299. Aspects of method 200 may provide performance or efficiency benefits for communication management. For example, aspects of method 200 may have positive impacts with respect to information credibility and response reliability. As described herein, the receiving, detecting, determining, and establishing described herein may each occur in an automated fashion without user invention. Altogether, establishing a communication arrangement based on a trust factor for a user may be associated with performance or efficiency benefits (e.g., communication efficiency, clarity, information accuracy).

Figure 3:
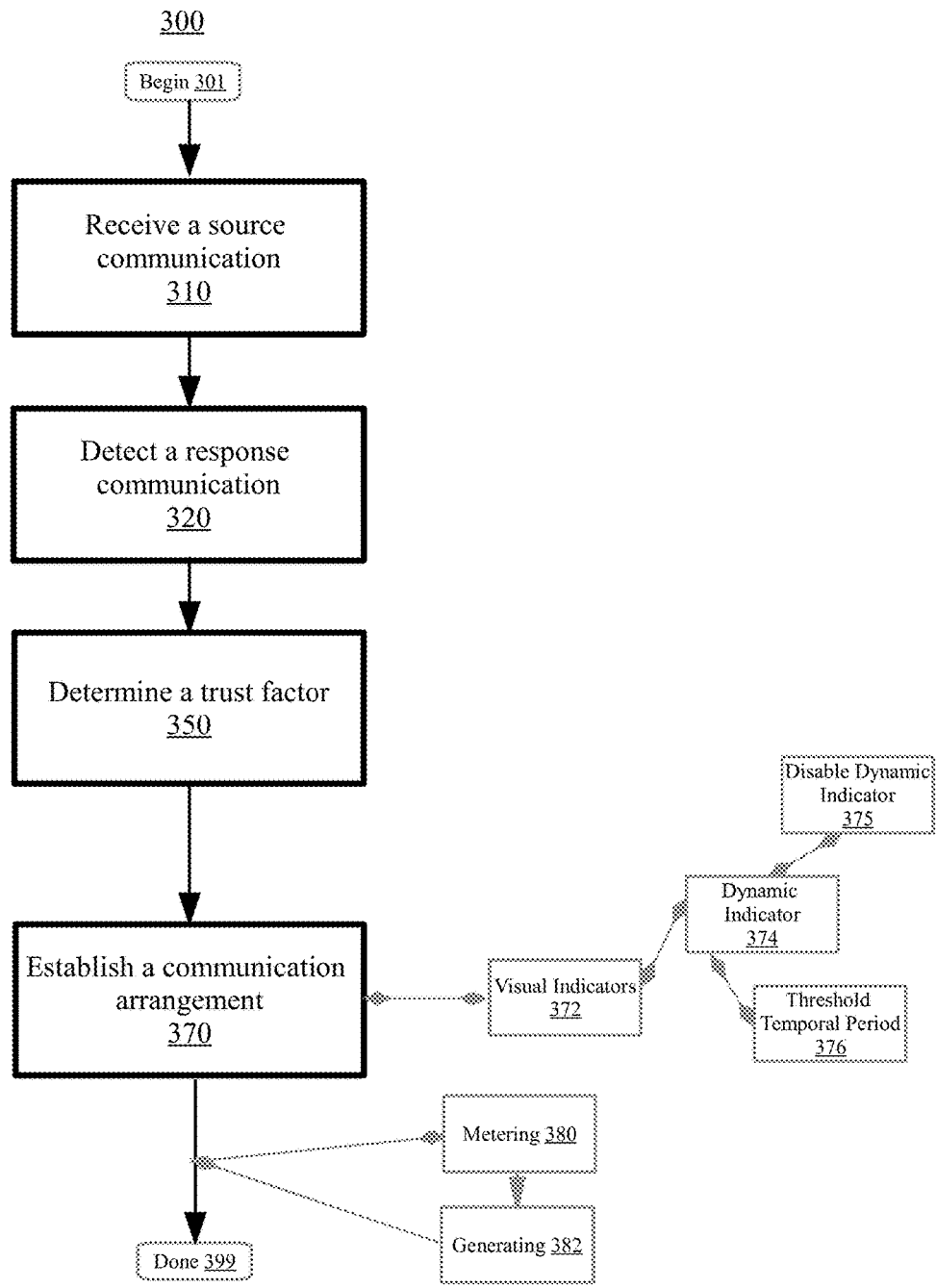
FIG. 3 is a flowchart illustrating a method for managing communication in a social networking environment, according to embodiments.

FIG. 3 is a flowchart illustrating a method 300 for managing communication in a social networking environment. Aspects of the method 300 relate to establishing a communication arrangement including a set of visual indicators. The method 300 may begin at block 301. At block 310, a source communication may be received. At block 320, a response communication may be detected. At block 350, a trust factor may be determined. At block 370, a communication arrangement may be established. The communication arrangement may facilitate communication efficiency. Aspects of the method 300 may substantially correspond to other embodiments described herein, including FIGS. 1-4.

In embodiments, the communication arrangement may include a set of visual indicators at block 372. Generally, the visual indicators can include markers, tags, or other graphical effects used to visually emphasize or de-emphasize one or more aspects of the source or response communication. In embodiments, the visual indicators may include highlighting, flagging, tagging, annotating, marking, adjusting the relative position, or otherwise modifying visual attributes of the source/response communication within the communication arrangement (e.g., structured prioritization). As described herein, the visual indicators may be used to emphasize or de-emphasize aspects of the source/response communication based on the trust factor or trust score of a user (e.g., emphasize communications originated by users with low trust scores, de-emphasize communications originated by users with high trust scores). As an example, in response to detecting a response communication originated by a user with a trust score below a threshold value, the communication arrangement may include marking the source communication with a red flag and placing the source communication in an "Attention Required" zone. As another example, in response to detecting a response communication originated by a user with a trust score above a threshold value, the communication arrangement may include marking the source communication with a green check mark and placing the source communication in a "Managed" zone. Other types of visual indicators are also possible.

In embodiments, the visual indicator may include a dynamic indicator at block 374. Generally, the dynamic indicator can include a sign, symbol, tag, mark, or other identifier used to convey that a response communication is being handled or managed by another recipient of the source communication and is in an in-progress state. As an example, in response to submission or transmission of a source communication, the social networking environment may monitor and detect an in-progress response communication. Accordingly, in response to detecting the response communication, the dynamic indicator may be presented within the communication arrangement (e.g., recipients of the source communication other than the originator of the response communication). As described herein, providing the dynamic indicator may include using one or more visual indicators. For instance, in embodiments, the dynamic indicator may include a blinking yellow square placed in the subject line of the source communication. In embodiments, the dynamic indicator may advise or suggest an action to a user. For example, the dynamic indicator may include a blinking green square to notify recipients that the user handling the response communication has a trust score above a threshold value (e.g., and further attention/action may not be necessary) or a blinking red square to notify a user that the user handling the response communication has a trust score below a threshold value (e.g., and further attention/action may be required).

In embodiments, the dynamic indicator may be configured to be disabled at block 375. Generally, disabling the visual indicator can include turning off, removing, or otherwise stopping the operation of the dynamic indicator. Aspects of the disclosure relate to the recognition that, in certain embodiments, displaying the in-progress status of the response communication may not be desirable to one or more recipients of the source communication. For instance, the originator of the response communication may not wish to publicize or display that he/she is drafting a communication to the source user, and disable provision of the dynamic indicator (e.g., in the communication arrangements of other recipients of the source communication). In certain embodiments, other recipients of the source communication may not wish to see the status of the response communication, and remove the dynamic indicator from their own communication arrangements. Other methods of disabling the dynamic indicator are also possible.

In embodiments, the set of visual indicators may include a threshold temporal period at block 376. Generally, the threshold temporal period can include a designated period of time (e.g., 10 minutes, 30 minutes, 1 hour) after which the in-progress state of the response communication is altered, changed, adjusted, or modified. In embodiments, the threshold temporal period may correspond to a period of inactivity with respect to the response communication (e.g., no keystrokes, clicks, or other input detected). The designated period of time may be automatically determined by the social network environment or specified by a user. In embodiments, in response to achievement of the threshold temporal period, the state of the response communication may change from "in-progress" to "paused." Consider the following example. In response to receiving a source communication addressed to four recipient users, a first recipient may begin generating a response communication. The response communication may be detected by the social networking environment, and the dynamic indicator may display a status of "in-progress" to the other three recipients as well as the source user of the source communication (e.g., as long as the dynamic indicator is not disabled.) In embodiments, the first recipient's attention may be called away from the response communication (e.g., he/she was called to a meeting). Accordingly, after the period of time designated by the threshold temporal period (e.g., 40 minutes) has passed, the in-progress status of the response communication may change to "paused" to indicate that the response communication is no longer in progress (e.g., and a follow-up action may be necessary by another recipient). Other methods of managing the threshold temporal period are also possible.

In embodiments, use of the communication arrangement may be metered at block 380. Metering can include measuring, tracking, documenting, recording, or calculating the degree or extent of the utilization of the communication arrangement. The degree of utilization may be calculated based on the number of times the communication arrangement was accessed (e.g., 10 times, 100 times), frequency of updates to the communication arrangement (e.g., based on the status of the response communication), number of received communications (e.g., total number of source and response communications processed by the communication arrangement), resource usage (e.g., data processed by the communication arrangement) or other means. Based on the metered use, an invoice may be generated at block 382. The invoice may include a bill, fee, service charge, or other itemized breakdown specifying compensation for the usage of the communication arrangement. Subscription based models are also possible.

Method 300 concludes at block 399. Aspects of method 300 may provide performance or efficiency benefits for communication management. For example, aspects of method 300 may have positive impacts with respect to information credibility and response reliability. As described herein, the receiving, detecting, determining, and establishing described herein may each occur in an automated fashion without user invention. Altogether, establishing a communication arrangement based on a trust factor for a user may be associated with performance or efficiency benefits (e.g., communication efficiency, clarity, information accuracy).

Figure 4:
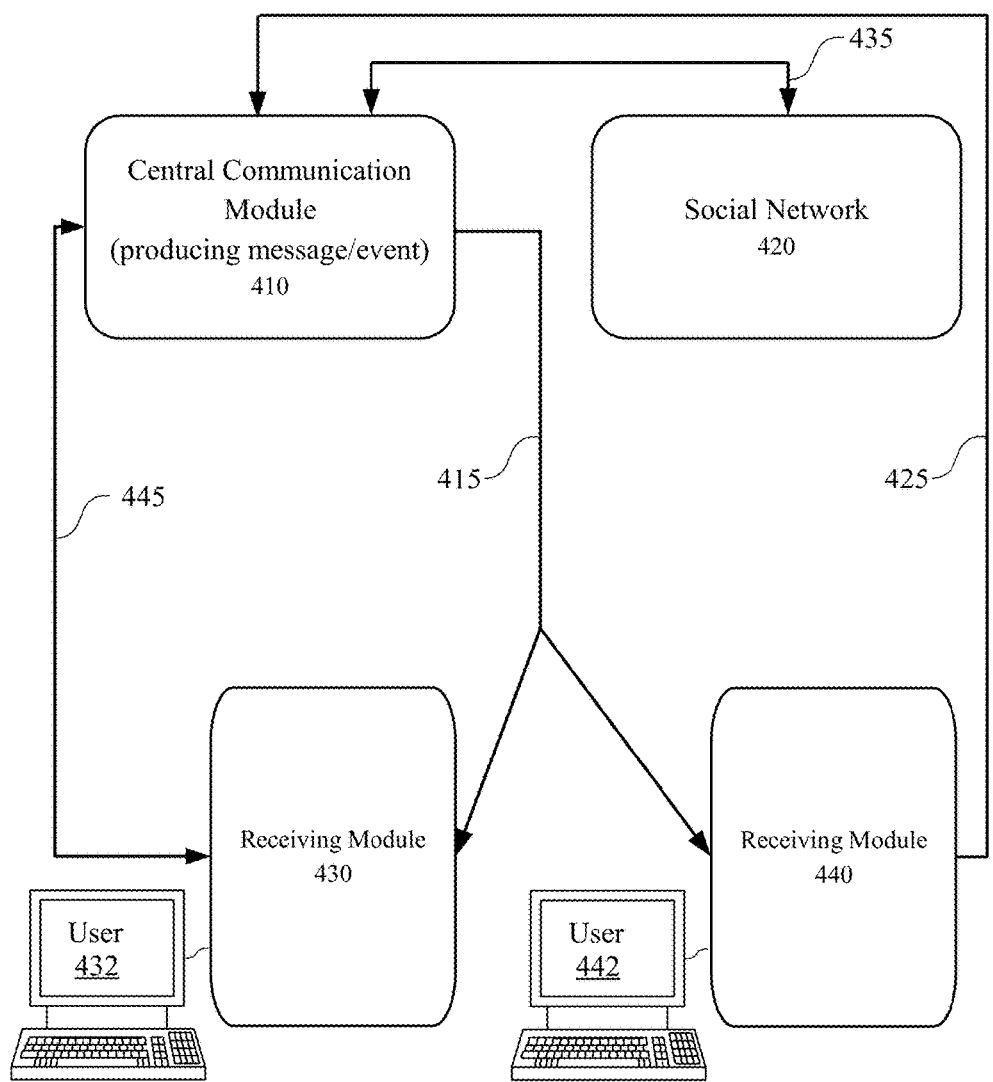
FIG. 4 is an example system for managing communication in a social networking environment, according to embodiments.

FIG. 4 is an example system 400 for managing communication in a social networking environment. Aspects of the method 400 relate to using a central communication module 410, a social network 420, a receiving module 430, and a receiving module stream 440 to facilitate communication between a group of users. Aspects of the method 400 may substantially correspond to other embodiments described herein, including FIGS. 1-4.

In embodiments, the system 400 may include a central communication module 400. Generally, the central communication module 410 can include a computer, tablet, smart phone, or other computing device configured to engage in communication (e.g., email, social networking features) on a network (e.g., local area network, internet). As described herein, the central communication module 410 may be configured to transmit a source communication related to a topic to one or more recipients (e.g., user 432 and user 442). The source communication can include a textual message, post, notification, voice message, video message or other form of correspondence or information transmission. As examples, the source communication may include an email message, instant message, text message, discussion forum post, newsfeed post, or the like. As shown in FIG. 4, in certain embodiments, the source message may be transmitted from the central communication module 410 to receiving module 430 and receiving module stream 440 via connection 415. Generally, the receiving modules 430, 440 can include an inbox, activity stream, newsfeed, or other system configured to receive communications.

In embodiments, in response to receiving the source communication from the central communication module 410, user 442 may begin drafting a response communication. The response communication can include a reply, answer, reaction, feedback, or other action taken to respond to the source communication. As described herein, in certain embodiments, the central communication module 410 may detect the response communication via connection 425. Detecting the response communication can include dynamically determining that the response communication is in an in-progress state (e.g., being drafted by user 442). In response to detecting the response communication, the central communication module 410 may be configured to query the social network 420 (e.g., a social networking profile) to identify a set of topic expertise data for the user 442 via connection 435. The topic expertise data may include aspects, traits, features, or characteristics of a user's background that demonstrate, verify, substantiate, or otherwise establish the expertise, credibility, or reliability of a user with respect to a particular field or discipline. Accordingly, based on the set of topic expertise data identified for the user 442, a trust factor may be computed for the user 442. In embodiments, the trust factor may be computed for the user 442 relative to the user 432. For instance, the trust factor computed for the user 442 may be calculated, modified or adjusted based on topic expertise data (e.g., organization position, educational background, or work experience) identified for the user 432.

In embodiments, a communication arrangement may be established for the receiving module 430 via the connection 445. Establishing the communication arrangement may be based on the trust factor determined for the user 442 with respect to the user 432. In embodiments, establishing the communication arrangement may include managing (e.g., arranging, organizing) the response communication within the receiving module 430 based on the determined trust factor between the user 432 and the user 442. In embodiments, the communication arrangement may be configured to indicate the relative importance, significance, or priority of the response communication with respect to the user 432.

As an example, in a scenario in which the trust factor for the user 442 includes a trust score that exceeds a threshold value, the communication arrangement may be configured to visually de-emphasize the response communication (e.g., as the user 442 is a trusted user, additional input or action on the part of the user 432 may not be necessary). In embodiments, the communication arrangement may include a dynamic indicator configured to convey the state of progress of the response communication. For instance, the dynamic indicator may indicate that the response communication is not being handled by another user, is in an in-progress state (e.g., being drafted by another user), or already completed and transmitted. Other methods of managing the response communication using the communication arrangement are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for communication management in a social networking environment, the method comprising:

receiving, by the social networking environment, a source communication with respect to a topic;

detecting, by the social networking environment in response to receiving the source communication, a response communication by a first user with respect to the topic;

determining, by the social networking environment using a set of topic expertise data for the first user with respect to the topic, a trust factor for the first user with respect to the topic, wherein determining the trust factor includes evaluating the credibility of the first user with regard to the topic of the source communication and generating a trust score as a quantitative indication of the first user's credibility with regard to the topic of the source communication; and establishing, in the social networking environment, a communication arrangement based on the trust factor for the first user with respect to the topic, the communication arrangement being unique to every user in the social networking environment, wherein establishing the communication arrangement comprises instantiating a platform with a graphical user interface to organize the communications based on the trust factor for the first user with respect to the topic, wherein the communication arrangement includes a response status component which corresponds to a state of the response communication, the response status component visually indicates to other recipients of the source communication that the response communication is currently being handled by the first user and displays the name and trust score of the first user, in response to the trust score of the first user handling the response communication being below a predetermined threshold, visually emphasizing the source communication in a structured prioritization provided to other recipients of the source communication via the graphical user interface; and in response to the trust score of the first user handling the response communication being above a predetermined threshold, visually de-emphasizing the source communication in a structured prioritization provided to other recipients of the source communication via the graphical user interface.

2. The method of claim 1, wherein the trust score is expressed as an integer between 0 and 100, where greater values are associated with higher levels of trust and lesser values are associated with lower levels of trust, or wherein the trust score is expressed using a letter grading system.

3. The method of claim 1, wherein the trust score is displayed using different colors to indicate different trust score levels.

4. The method of claim 1, wherein determining, by the social networking environment using the set of topic expertise data for the first user with respect to the topic, the trust factor for the first user with respect to the topic includes:
examining, using an analysis technique, at least one of the source communication or the response communication;
extracting, both based on and in response to the examining, the topic;
correlating, in response to the extracting, the topic to the set of topic expertise data for the first user; and
computing the trust factor for the first user with respect to the topic.

5. The method of claim 4, wherein the analysis technique includes a natural language processing technique.

6. The method of claim 1, wherein the set of topic expertise data for the first user is selected from the group consisting of:
a set of competency criteria corresponding to a set of topics,
a set of hierarchical elements for utilization to weight the set of competency criteria,
a set of historical satisfaction data, and
a set of flagged topics.

7. The method of claim 1, further comprising:
receiving, by the social networking environment in response to establishing the communication arrangement based on the trust factor for the first user with respect to the topic, the response communication.

8. The method of claim 1, wherein the trust factor is selected from the group consisting of:
a competence level of the first user for the topic,
a current status of handling the source communication,
a historical reliability of handling other communications based on the topic,
a source user of the source communication,
a set of source recipients of the source communication,
a set of response recipients of the response communication, and
a temporal urgency element.

9. The method of claim 1, wherein the social networking environment is selected from the group consisting of: instant messaging (IM), short message services (SMS), wiki, social community, newsfeed, email, and project collaboration.

10. The method of claim 1, wherein the set of visual indicators includes a dynamic indicator when the response communication is in an in-progress state.

11. The method of claim 10, further comprising:
disabling, in the social networking environment, the dynamic indicator.

12. The method of claim 10, wherein the in-progress state includes a threshold temporal period.

13. The method of claim 1, wherein the receiving, the detecting, the determining, and the establishing each occur in an automated fashion without user intervention.

14. The method of claim 1, further comprising:
metering use of the communication arrangement; and
generating an invoice based on the metered use.

15. A computer-implemented method for communication management in a social networking environment, the method comprising:
receiving, by the social networking environment, a source communication with respect to a topic;
detecting, by the social networking environment in response to receiving the source communication, a response communication by a first user with respect to the topic;
determining, by the social networking environment using a set of topic expertise data for the first user with respect to the topic, a trust factor for the first user with respect to the topic, wherein determining the trust factor includes evaluating the credibility of the first user with regard to the topic of the source communication and generating a trust score as a quantitative indication of the first user's credibility with regard to the topic of the source communication;
establishing, in the social networking environment, a communication arrangement based on the trust factor for the first user with respect to the topic, the communication arrangement being unique to every user in the social networking environment,
wherein establishing the communication arrangement comprises instantiating a platform with a graphical user interface to organize the communications based on the trust factor for the first user with respect to the topic;
in response to the trust score of the first user handling the response communication being below a predetermined threshold, visually emphasizing the source communication in a structured prioritization provided to other recipients of the source communication via the graphical user interface, the visual emphasis indicating that the credibility of the first user currently handling the response communication has not been verified; and
in response to the trust score of the first user handling the response communication being above a predetermined threshold, visually de-emphasizing the source communication in a structured prioritization provided to other recipients of the source communication via the graphical user interface, the visual de-emphasis indicating that the credibility of the first user currently handling the response communication has been verified.

16. The method of claim 15, wherein the communication arrangement includes a response status component which corresponds to a state of the response communication, the response status component visually indicates to other recipients of the source communication that the response communication is currently being handled by the first user and displays the name and trust score of the first user.

17. The method of claim 15, further comprising:
displaying the trust score of the first user next to the name of the first user in the communication arrangement.

18. A computer-implemented method for communication management in a social networking environment, the method comprising:
receiving, by the social networking environment, a source communication with respect to a topic;

detecting, by the social networking environment in response to receiving the source communication, a response communication by a first user with respect to the topic, wherein detecting the response communication by the first user with respect to the topic includes dynamically ascertaining the response communication is in-progress by the first user;

determining, by the social networking environment using a set of topic expertise data for the first user with respect to the topic, a trust factor for the first user with respect to the topic, wherein determining the trust factor includes evaluating the credibility of the first user with regard to the topic of the source communication and generating a trust score as a quantitative indication of the first user's credibility with regard to the topic of the source communication;

establishing, in the social networking environment, a communication arrangement based on the trust factor for the first user with respect to the topic, the communication arrangement being unique to every user in the social networking environment, wherein establishing the communication arrangement comprises instantiating a platform with a graphical user interface to organize the communications based on the trust factor for the first user with respect to the topic, and in response to dynamically ascertaining the response communication is in-progress by the first user and in response to the trust score of the first user handling the response communication being below a predetermined threshold, visually emphasizing the source communication in a structured prioritization provided to other recipients of the source communication via the graphical user interface, the visual emphasis indicating that the credibility of the first user currently handling the response communication has not been verified.

19. The method of claim 18, wherein the communication arrangement includes a response status component which corresponds to a state of the response communication, the response status component visually indicates to other recipients of the source communication that the response communication is in-progress by the first user and displays the name and trust score of the first user.

20. The method of claim 18, wherein dynamically ascertaining that the response communication is in-progress by the first user includes:

dynamically ascertaining the first user is typing a reply, or dynamically ascertaining the first user is gathering information to craft a response.

* * * * *